US009756544B2

United States Patent
Ananthanarayanan et al.

(10) Patent No.: US 9,756,544 B2
(45) Date of Patent: Sep. 5, 2017

(54) RECONFIGURABLE ANTENNA SYSTEM

(71) Applicant: Amazon Technologies, Inc., Seattle, WA (US)

(72) Inventors: Peruvemba Ranganathan Sai Ananthanarayanan, Sunnyvale, CA (US); Chun Kit Lai, Cupertino, CA (US); Adrian Napoles, Cupertino, CA (US); Namhoon Kim, San Jose, CA (US); Eswarappa Channabasappa, Sunnyvale, CA (US); Ulf Jan Ove Mattsson, Saratoga, CA (US); Anuj Dron, San Jose, CA (US); Daejoung Kim, Sunnyvale, CA (US); Rohit Sammeta, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 14/530,414

(22) Filed: Oct. 31, 2014

(65) Prior Publication Data
US 2016/0127972 A1    May 5, 2016

(51) Int. Cl.
*H04W 36/30*    (2009.01)
*H04W 84/12*    (2009.01)
(Continued)

(52) U.S. Cl.
CPC .......... *H04W 36/30* (2013.01); *H04B 1/0064* (2013.01); *H04W 76/02* (2013.01);
(Continued)

(58) Field of Classification Search
CPC .... H04B 7/0608; H04B 7/061; H04B 7/0814; H04B 1/38; H04B 1/006; H04B 7/0413; H04B 7/04; H04B 7/0697; H04B 7/02; H04B 7/0404; H04B 1/0064; H04B 1/3838; H04B 7/06; H04B 1/04; H04W 36/30;
(Continued)

(56) References Cited

U.S. PATENT DOCUMENTS 8,036,710 B2    10/2011    Walton et al.
8,498,656 B2    7/2013    Mujtaba et al.
(Continued)

OTHER PUBLICATIONS

International Search Report and Written Opinion of the International Searching Authority for PCT Application No. PCT/US2015/057594 mailed Feb. 2, 2016.

*Primary Examiner* — Brian O'Conner
(74) *Attorney, Agent, or Firm* — Lowenstein Sandler LLP

(57) ABSTRACT

A user device selects a communication module from a plurality of communication modules of the user device to communicate first data to a first device in a first configuration, selects a first antenna from a plurality of antennas of the user device to communicate the first data in the first configuration, and couples the communication module to the first antenna in the first configuration. The user device additionally selects the communication module to communicate second data to a second device in a second configuration, selects the first antenna and a second antenna from the plurality of antennas to communicate the second data in the second configuration, and couples the communication module to the first antenna and the second antenna in the second configuration.

17 Claims, 12 Drawing Sheets

(51) Int. Cl.
*H04W 76/02* (2009.01)
*H04W 76/06* (2009.01)
*H04W 88/06* (2009.01)
*H04B 1/00* (2006.01)
H04B 1/04 (2006.01)
H04B 1/3827 (2015.01)
H04B 7/06 (2006.01)

(52) U.S. Cl.
CPC ........... *H04W 76/06* (2013.01); *H04W 84/12* (2013.01); *H04W 88/06* (2013.01); *H04B 1/04* (2013.01); *H04B 1/3838* (2013.01); *H04B 7/06* (2013.01); *H04B 7/061* (2013.01); *H04B 7/0608* (2013.01)

(58) Field of Classification Search
CPC ..... H04W 76/02; H04W 76/06; H04W 84/12; H04W 88/06; H04W 24/00
See application file for complete search history.

(56) References Cited

U.S. PATENT DOCUMENTS

| | | | |
|---|---|---|---|
| 8,903,329 B2* | 12/2014 | Maguire | H04B 5/02 455/103 |
| 8,942,772 B2* | 1/2015 | Yan | H04B 7/0608 455/437 |
| 9,240,830 B2* | 1/2016 | Ljung | H04B 7/0608 |
| 9,438,293 B2* | 9/2016 | Slater | H04B 1/3838 |
| 2009/0082017 A1* | 3/2009 | Chang | H04B 1/406 455/435.2 |
| 2012/0009886 A1* | 1/2012 | Poulin | H04B 1/0064 455/78 |
| 2012/0099562 A1* | 4/2012 | Smadi | H04W 36/08 370/332 |
| 2014/0092877 A1* | 4/2014 | Kazmi | H04W 88/06 370/336 |
| 2014/0273884 A1 | 9/2014 | Mantravadi et al. | |
| 2014/0364068 A1* | 12/2014 | Maguire | H04B 5/02 455/73 |
| 2015/0017978 A1* | 1/2015 | Hong | H04W 88/06 455/426.1 |
| 2015/0180514 A1* | 6/2015 | Pavacic | H04B 1/0064 455/552.1 |
| 2015/0200463 A1* | 7/2015 | Heikura | H01O 1/245 455/73 |
| 2015/0207536 A1* | 7/2015 | Yehezkely | H03H 11/02 455/78 |
| 2015/0257100 A1* | 9/2015 | Su | H04W 36/0016 455/574 |
| 2016/0043752 A1* | 2/2016 | Slater | H04B 1/3838 375/297 |
| 2016/0105151 A1* | 4/2016 | Langer | H03F 1/0227 330/295 |
| 2016/0134349 A1* | 5/2016 | Ljung | H04B 7/0608 455/77 |

\* cited by examiner

RECONFIGURABLE ANTENNA SYSTEM

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1A:
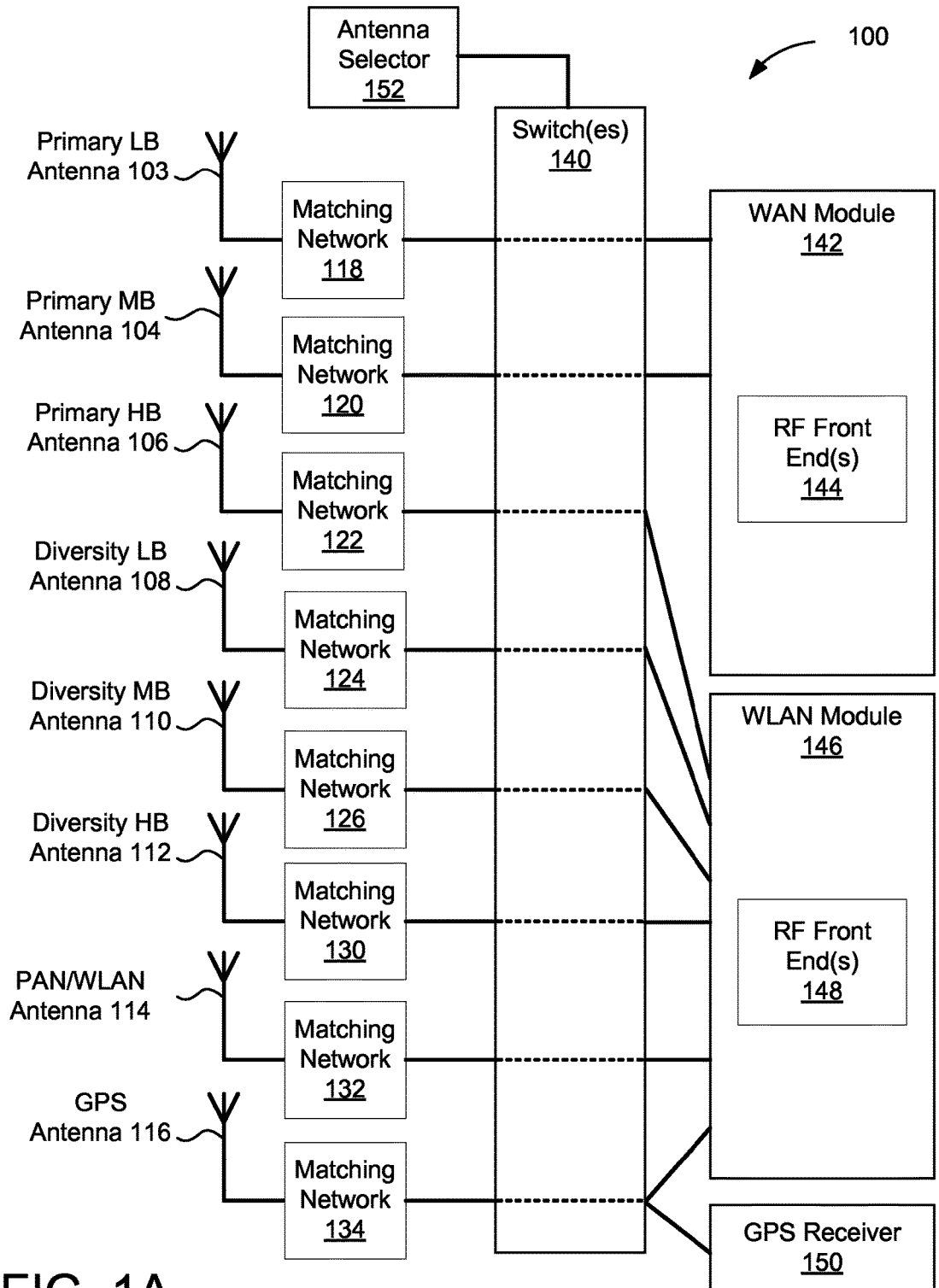
FIG. 1A is a block diagram of a switchable antenna architecture for a user device according to one embodiment in which a majority of antennas are being used by a WLAN module.

A switchable antenna architecture for a user device, such as a mobile phone or table computer, is described. In embodiments a user device includes such a switchable antenna architecture. The switchable antenna architecture includes one or more switches that connect to multiple antennas of the user device. The user device determines for any given situation an optimal assignment of antennas to wireless modules (e.g., such as a long term evolution (LTE) modem, a WLAN module, a global positioning system (GPS) receiver, a personal area network (PAN) module, etc.). The user device then adjusts a configuration of the switch (or switches) to connect particular antennas to particular wireless modules. The user device may also activate switches that may electrically connect together multiple short antennas optimized for high frequency band or medium frequency band transmissions to from a single longer antenna optimized for low frequency band transmissions. As conditions of the user device change, the user device may modify the assignment of the various antennas to the various wireless modules.

In a constrained radiation space (low and thin profiles for mobile devices) of user devices, antenna engineers face various challenges. For example, one problem facing antenna engineers is that WLAN (e.g., the Wi-Fi® technology) may implement two-by-two (2×) or three-by-three (3×) multiple-input multiple-output (MIMO) antennas for MIMO operations for certain handheld electronic devices. Due to the space constraint, the addition of additional WLAN antennas is costly in materials and real estate within the electronic device. Another problem facing antenna engineers is designing an antenna that can be used in various antenna technologies across the globe.

Due to the limited form factor of user devices such as mobile phones and tablet computers, it is generally not feasible to have dedicated antennas to support higher order multiple-input multiple-output (MIMO) systems that are capable of supporting MIMO communications. However, such higher order MIMO systems provide increased bandwidth and thus may provide an improved user experience. In MIMO communications, multiple antennas are used at both the transmitter and receiver to improve communication performance. Multiple antennas may be used to perform functions such as spreading a total transmit power over the antennas to achieve an array gain and/or achieving diversity gain that improved link reliability. Alternatively, multiple (e.g., all) transmitters may transmit at the same power to improve throughput capacity. Moreover, in many circumstances user devices have idle or unused antennas. For example, in most current mobile phones, a global positioning system (GPS) receiver has a dedicated GPS antenna, a wireless modem (e.g., a long term evolution (LTE) modem) has multiple dedicated wide area network (WAN) antennas, and a WLAN module has a dedicated WLAN antenna. However, if a user is not using a navigation program and is not near any WLAN access points, the GPS antenna and WLAN antenna may go unused. Similarly, if the user is connected to a WLAN network (e.g., in a connected state to a WLAN) and using WLAN for voice and/or data transmissions, then the GPS and one or more WAN antennas may go unused. In a connected state to a WLAN, an WLAN module may exchange frequency or periodic packets, and the WLAN module may gain access to further networks such as the Internet or a network of a wireless carrier.

Embodiments described herein enable antennas that would otherwise go unused or underutilized to be assigned as additional antennas to wireless modules with MIMO capabilities. For example, when MIMO Wi-Fi is available for performing MIMO communications, the user device may dedicate adequate antenna resources to enable maximum throughput. In another example, the user device may designate a best antenna element (antenna with most optimal properties for a particular frequency band) to transmit and primary receive functionality for a WAN module, and may designate additional antennas for secondary receive functionality.

FIG. 1A is a block diagram of a switchable antenna architecture 100 for a user device according to one embodiment. The user device (also referred to herein as an electronic device) may be any content rendering device that includes a wireless modem for connecting the user device to a network. Examples of such user devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

In the illustrated example, the switchable antenna architecture 100 includes a primary low frequency band antenna (LB antenna) 103 and a diversity LB antenna 108. A diversity antenna is a secondary antenna that may be used along with the one or more primary antennas to improve the quality and reliability of a wireless link. There may be no clear line-of-sight between a transmitter and a receiver. Instead, a signal may undergo multiple reflections between transmission and reception. Each reflection may introduce time delays, phase shifts, distortions, attenuations, etc. that can degrade a signal quality. The diversity antennas have a different location and/or configuration than the primary antennas on the user device, and may therefore experience different phase shifts, time delays, attenuations, distortions, etc. Accordingly, signals at the diversity antenna can be compared to signals at the primary antenna to determine and mitigate such effects. The primary LB antenna 103 and diversity LB antenna 108 may have a length and configuration that are optimized for transmission and receipt of radio frequency (RF) signals in the range of about 700 Megahertz (MHz) to about 1000 MHz.

The switchable antenna architecture 100 additionally includes a primary mid frequency band antenna (MB antenna) 104 and a diversity MB antenna 110. The primary MB antenna 104 and diversity MB antenna 110 may have a length and configuration that are optimized for transmission and receipt of RF signals in the range of about 1700 MHz to about 2200 MHz. The switchable antenna architecture 100 additionally includes a primary high frequency band antenna (HB antenna) 106 and a diversity HB antenna 112. The primary HB antenna 106 and diversity HB antenna 112 may have a length and configuration that are optimized for transmission and receipt of RF signals in the range of about 2300 MHz to about 2700 MHz. The switchable antenna architecture 100 additionally includes a personal area network (PAN)/WLAN antenna 114 with a length and size optimized for 2.4 GHz RF signals. One example of a PAN protocol is Bluetooth. The switchable antenna architecture 100 additionally includes a GPS antenna 116 with a length and size optimized for RF signals in the range of about 1400 MHz to about 1600 MHz. Numerous other antenna selections may be used in various user devices. For example, a user device may have fewer primary antennas and/or fewer diversity antennas.

The switchable antenna architecture 100 additionally includes multiple wireless modules and/or other communication modules, such as a wide area network (WAN) module 142, a wireless local area network (WLAN) module 146 and a GPS receiver 150. The switchable antenna architecture 100 may also include other wireless modules such as a near field communication (NFC) module, a Zigbee® module, an amplitude modulation (AM) radio receiver, a frequency modulation (FM) radio receiver, a personal area network (PAN) module (e.g., a Bluetooth® module), a Global Navigation Satellite System (GLONASS) receiver, and so on. Each wireless module may be configured to communicate data to one or more other devices using transmissions complying with specific communication protocols. Additionally, each wireless module may be configured to radiate electromagnetic energy (e.g., radio frequency (RF) signals) in different frequency bands. Some wireless modules may include multiple transceivers, transmitters and/or receivers, and may support multiple-input multiple-output (MIMO) functionality.

The WAN module 142 may be a wireless module for connecting to wireless base stations of a wireless carrier. The WAN module 142 may be configured to transmit and receive data using one or more WAN protocols, such as cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Long Term Evolution (LTE) and LTE Advanced (sometimes generally referred to as 4G), etc. The WAN module 142 may include one or more transmitters and/or transceivers, and may additionally include one or more primary receivers and/or secondary receivers. For example, a primary transceiver may transmit and receive signals tuned to a first band (e.g., approximately 729 MHz~2700 MHz in one embodiment) and a secondary receiver may receive and process signals tuned to a second band (e.g., approximately 729 MHz~2700 MHz in one embodiment). A WAN primary transceiver and secondary RF receiver may allow the user device to receive data using radio waves in the WAN bands via one or more antennas. In particular, the WAN secondary RF receivers may be coupled to one or more receive channels for WAN high band (HB), WAN mid band (MB) and/or WAN low band (LB).

The WLAN module 146 may include a WLAN RF transceiver for communications on one or more Wi-Fi® bands (e.g., 2.4 GHz and 5 GHz). It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel.

The WAN module 142 and WLAN module 146 may each include one or multiple RF front ends (RFFEs). The RF front ends 144, 148 may include receivers and/or transceivers, filters, amplifiers, mixers, switches, and/or other electrical components. One example of an RF front end is described with reference to FIG. 2.

The GPS receiver 150 allows the user device to receive GPS data using radio waves in the GPS band (approximately 1575 MHz) via the GPS antenna 116 or another antenna.

The switchable antenna architecture 100 additionally includes a switch or multiple switches 140. In one embodiment, multiple switches 140 are used. These switches may be any type of switch box or other switching device. The switches may be, for example, single pole seven throw (SP7T) switches, single pole eight throw (SP8T) switches, single pole six throw (SP6T) switches, etc. The switches may be basic switches, or may include additional components such as filters, static or variable capacitors, static or variable inductors, and so on. The switches 140 may be micro-electrical-mechanical systems (MEMS) based switching devices, discrete component type switching devices, transistor based switching devices, or any other device that can selectively couple and decouple antennas from wireless modules. The types of switches (e.g., number of throws) or switching devices may be based on the number of antennas and/or the number of modules. The types of switches may also be based on a desired flexibility. For example, in some instances it may be desirable for a particular antenna to only be switchable between a few modules. Thus, a smaller switch may be used for such an antenna. Similarly, a particular module may only be switchable to a few antennas, which may also be implemented with a switch having fewer throws. Alternatively, a single more complex switch may be used that has multiple inputs and multiple outputs. Such a switch may be able to connect any of the antennas to any of the wireless modules.

In one embodiment, each of the antennas 103-116 is connected to an antenna matching network 118-134 that is on a transmit/receive path between the switches 140 and the antennas 103-116. Alternatively, antenna matching networks 118-134 may be omitted for one or more antennas. Antenna matching networks 118-134 may also be integrated into switches 140 and/or positioned on the transmit/receive path between the switches and the wireless modules 142, 146, 150. Antenna matching networks 118-134 may be fixed antenna matching networks or may be reconfigurable antenna matching networks.

Each antenna may be optimized or tuned for a particular frequency range. In other words, an antenna may have an impedance that is matched to an impedance associated with a particular frequency band. However, any antenna might be allocated to a wireless module for use at a different frequency range than that antenna is optimized for. Accordingly, a reconfigurable antenna matching network 118-134 may be reconfigured to tune the antenna to the frequency range at which it will be used. For example, the GPS antenna 116 might be configured for optimal use at GPS frequencies of about 1575 MHz. However, the GPS antenna 116 may be connected by a switch 140 to WLAN module 146, which might use frequencies on the order of 2.4 GHz. Thus, antenna matching network 134 may be used to tune the impedance, phase, etc. of the GPS antenna 116 for use at 2.4 GHz. Alternatively, a fixed antenna matching network may be connected to a transmit/receive path at the input of a wireless module. The fixed antenna matching network may be bypassed for connection to some antennas, and may be used for connections to other antennas. An example antenna matching network is described with reference to FIG. 3.

As shown, the GPS antenna 116 may be connected to both the GPS receiver 150 and the WLAN module 146 concurrently. Alternatively, the GPS antenna 116 may be connected to only the WLAN module 146, only the GPS receiver 150, or only to the WAN module 142. When the GPS antenna is connected to two different modules (e.g., to the WLAN module 146 and the GPS receiver 150), the switch 140 or other circuitry may perform time division multiplexing to share the GPS antenna 116. Other modules may also share other antennas in a similar manner.

In some embodiments, antenna matching networks are reconfigurable antenna matching networks. Additionally, in some embodiments antenna matching networks 118-134 are not used. For example, antenna matching networks may be omitted in some instances, such as for connecting the GPS antenna 116 to GPS receiver 150, because the antenna may be engineered to have the proper impedance when connected to the GPS receiver 150. In such an embodiment, some switch terminals for the switches may connect to fixed antenna matching networks. For example, a fixed antenna matching network may be part of the signal path between the WLAN module 146 and a switch for the WLAN module 146, but may not be part of the signal path between the GPS receiver 150 and a switch for the GPS receiver 150. The use of such fixed antenna matching networks may reduce the time to reconfigure antennas for use with different wireless modules.

An antenna selector 152 may be connected to the one or more switches 140, and may send instructions to the one or more switches 140 to cause the switches to switch specified antennas to specified wireless modules. The antenna selector 152 may be software programmed to run on various operating systems, such as Windows® operating systems, Unix® operating systems, iOS® operating systems, Android® operating systems and Java® operating systems to name a few. The antenna selector 152 may also be configured as firmware, or as hardware, or as some combination of software, firmware and/or hardware. The antenna selector 152 may receive multiple different inputs from applications running on the user device, from an operating system, from sensors, from the wireless modules, and/or from other sources. The antenna selector 152 may prioritize the wireless modules based on the received information. The antenna selector may then assign particular antennas to particular wireless modules and send the appropriate instructions to the switch (or switches) 140 to implement the assignments. This may include determining a particular configuration for the antennas and the wireless modules, and then causing the switch 140 to disconnect one or more wireless modules from antennas and connect one or more wireless modules to antennas in accordance with the particular configuration.

In the illustrated example, the antenna selector 152 has detected that a higher order MIMO WLAN access point is providing a strong signal (e.g., that exceeds a signal strength threshold) and that the user device is authenticated to the WLAN access point. To take advantage of the higher order MIMO capabilities of the WLAN access point and the user device, the antenna selector 152 has assigned the primary HB antenna 106, diversity LB antenna 108, diversity MB antenna 110, diversity HB antenna 112, PAN/WLAN antenna 114 and GPS antenna 116 to the WLAN module 146. Primary LB antenna 103 and primary MB antenna 104 remain connected to WAN module 142 to support voice calls and to maintain a connection to a wireless carrier base station in case the user device should lose connection to the WLAN access point.

Figure 1B:
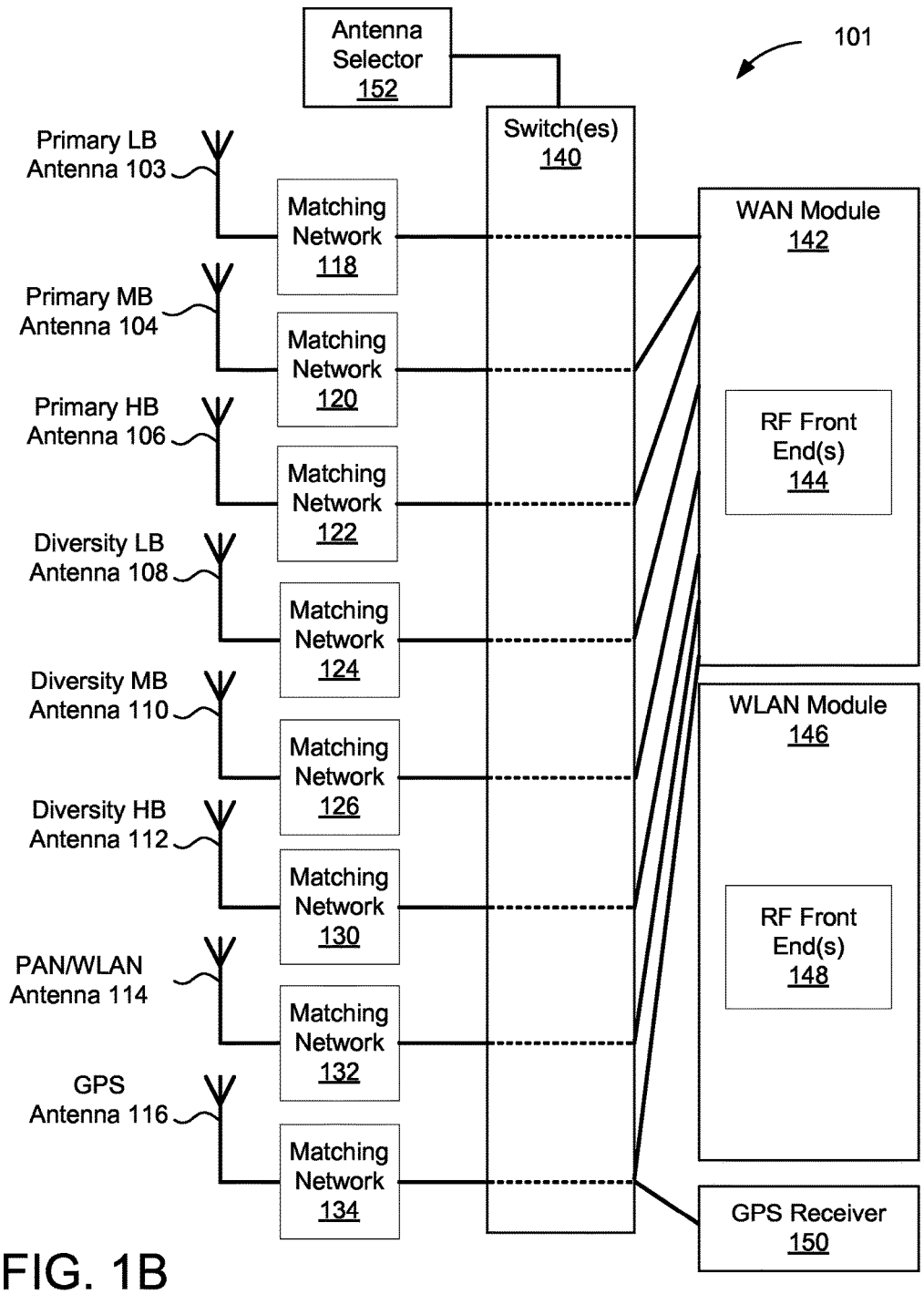
FIG. 1B is a block diagram of a switchable antenna architecture for a user device according to one embodiment in which a majority of antennas are being used by a WAN module.

FIG. 1B shows a switchable antenna architecture 101 corresponding to switchable antenna architecture 100 of FIG. 1A, but with a different antenna configuration. In the illustrated example, the antenna selector 152 has detected that the user device has lost connection to the WLAN access point. To take advantage of higher order WAN (e.g., LTE) capabilities provided by a wireless carrier and the user device, the antenna selector 152 has reassigned the primary HB antenna 106, diversity LB antenna 108, diversity MB antenna 110, and diversity HB antenna 112 to WAN module 142. The PAN/WLAN antenna 114 may remain connected to WLAN module 146 to scan for WLAN access points. Alternatively, the PAN/WAN antenna 114 may also connect to the WAN module 142 as shown. In one embodiment, all antennas are tuned to a mid-band of the WAN module 142. Additionally, an application running on the user device may have requested location services, and thus the GPS antenna 116 may be reassigned to the GPS receiver 150 and/or may be shared by the GPS receiver 150 and the WAN module.

Figure 1C:
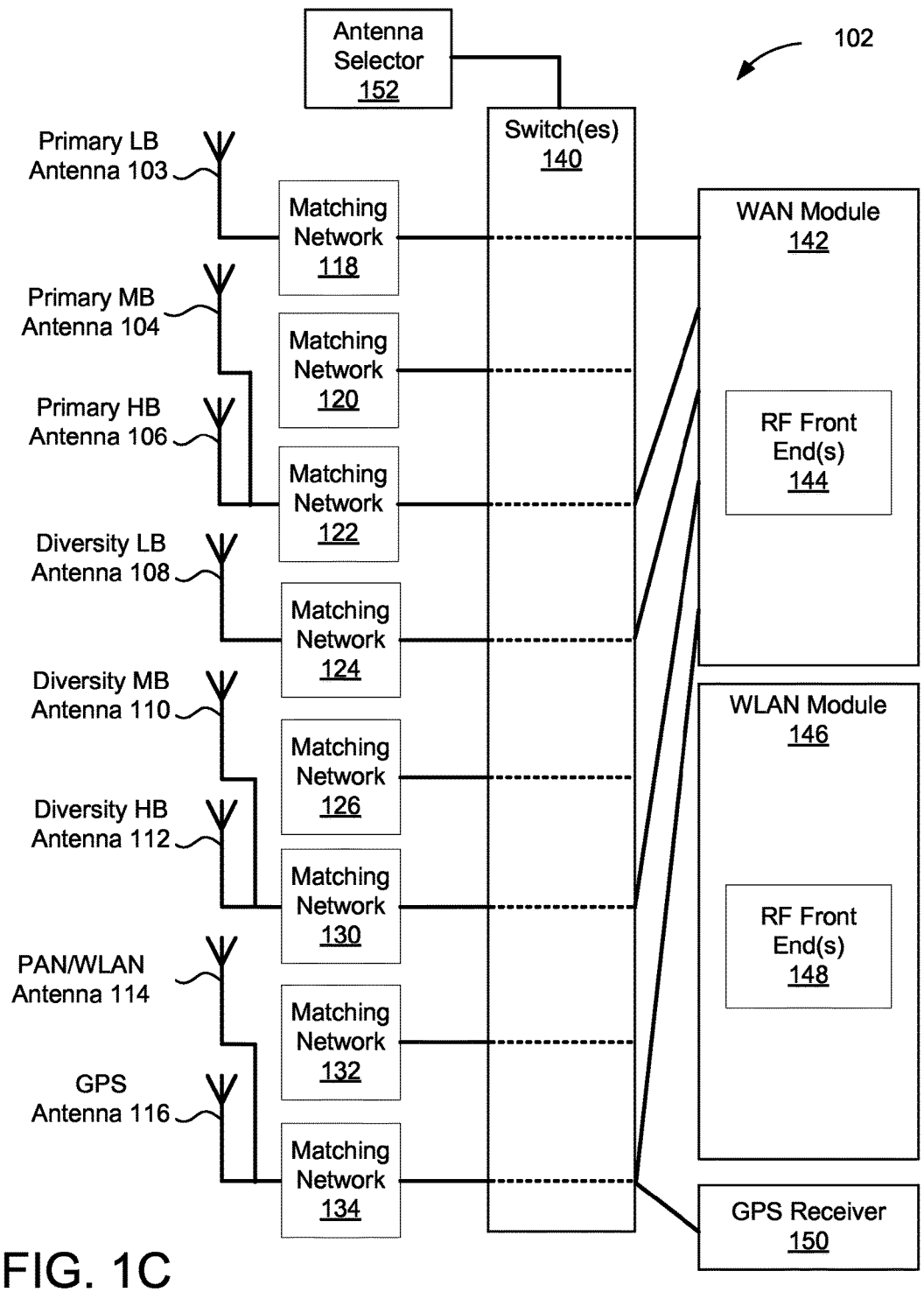
FIG. 1C is a block diagram of a switchable antenna architecture for a user device according to one embodiment in which all antennas are being used by a WAN module.

FIG. 1C shows a switchable antenna architecture 102 corresponding to switchable antenna architecture 100 of FIG. 1A, but with a different antenna configuration. In the illustrated example, the antenna selector 152 has detected that the user device is in a location where the user device will be using a LB connection to a base station of a wireless carrier. To improve connection to the base station, the antenna selector 152 has reassigned all antennas 103-116 to the WAN module 142. Additionally, since LB frequency signals will be relied upon, antenna selector has connected multiple HB and MB antennas to create additional diversity LB antennas. In particular, antenna selector 152 has triggered switches that cause primary MB antenna 104 to join together with primary HB antenna 106 to create a single LB antenna. Similarly, diversity MB antenna 110 and diversity HB antenna 112 have been electrically connected to form another LB diversity antenna. Similarly, PAN/WLAN antenna 114 and GPS antenna 116 have been linked together to form another LB diversity antenna. Accordingly, the different antennas may be electrically isolated from one another (have a first antenna configuration) when multiple LB antennas are not to be used. However, when multiple LB antennas are to be used, two or more antennas may be electrically connected to form a longer antenna structure that may have different or lower resonance frequencies.

During operation the antenna selector 152 is configured to control one or more switches to cause the switches to electrically isolate or electrically connect two or more of the antennas 103-116. Antenna selector 152 may, for example, change the length or the type of the antenna structure of one or more of the antennas by connecting them together. For example, the antenna selector 152 can configure the primary MB antenna 106 and primary HB antenna 106 to operate in a first antenna configuration in a first mode and in a second antenna configuration in a second mode. In particular, the antenna selector 152 can electrically isolate the primary MB antenna 106 from the primary HB antenna 106 to operate as separate distinct antennas in the first mode, and the antenna selector 152 can electrically connect the primary MB antenna 106 to the primary HB antenna 106 to operate as a combined second antenna configuration in the second mode. The antennas may be any type of antennas, such as monopole antennas, loop antennas, patch antennas, inverted F antennas, planar inverted F antennas, and so forth.

Figure 2:
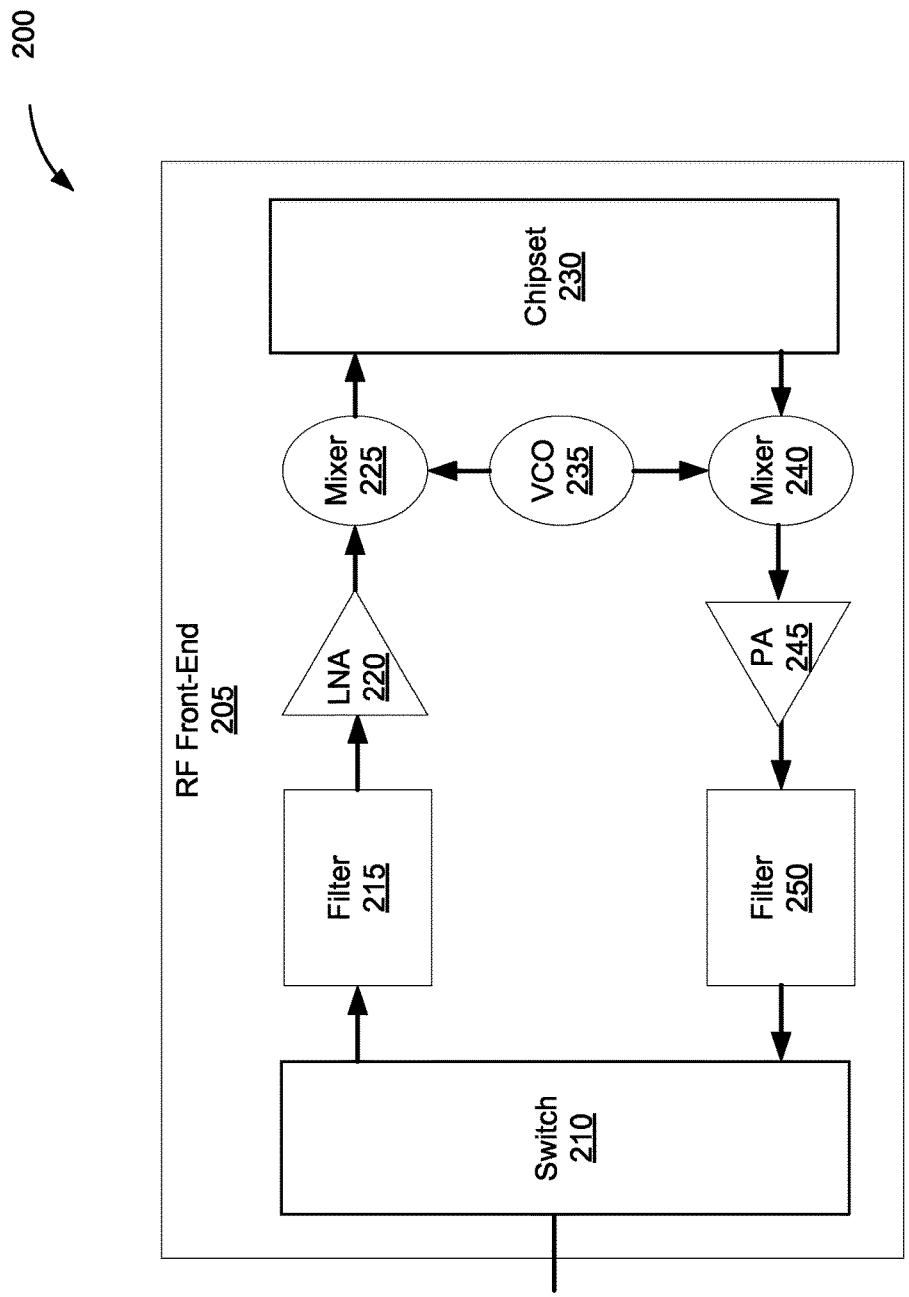
FIG. 2 is a block diagram of RF front-end circuitry for a wireless module according to one embodiment.

FIG. 2 is a block diagram of RF front-end circuitry 205 for a wireless module according to one implementation. In one embodiment, the RF front-end circuitry 205 includes a switch 210 to switch between a send and a receive path. The RF front-end circuitry 205 additionally includes a filter 215 on the receive path and a filter 250 on the send path. The filters 215, 250 may be band pass filters (BPF) to pass a particular frequency range used by chipset 230. For example, if chipset 230 is a WLAN transceiver, then filters 215 may be 2.4 GHZ band pass filters. Chipset 230 may be, for example, a WLAN transceiver chipset, a WAN transceiver chipset, a WAN receiver chipset, a GPS receiver chipset, and so forth. After the filter 215 on the receiver path is a low noise amplifier (LNA) 220 to amplify the filtered signal. LNA 220 is followed by a mixer 225, which mixes the filtered and amplified signal with a signal from a voltage controlled oscillator (VCO) 235. The mixed signal is provided to chipset 230.

On the send path, the chipset 230 outputs a signal to mixer 240. Mixer 240 mixes the signal with a signal from VCO 235. Mixer 240 provides the mixed signal to a power amplifier (PA) 245. The power amplifier 245 amplifies the signal and provides the amplified signal to filter 250. Filter 250 then filters the signal and provides the filtered signal to switch 210 for transmission via an attached antenna.

Figure 3:
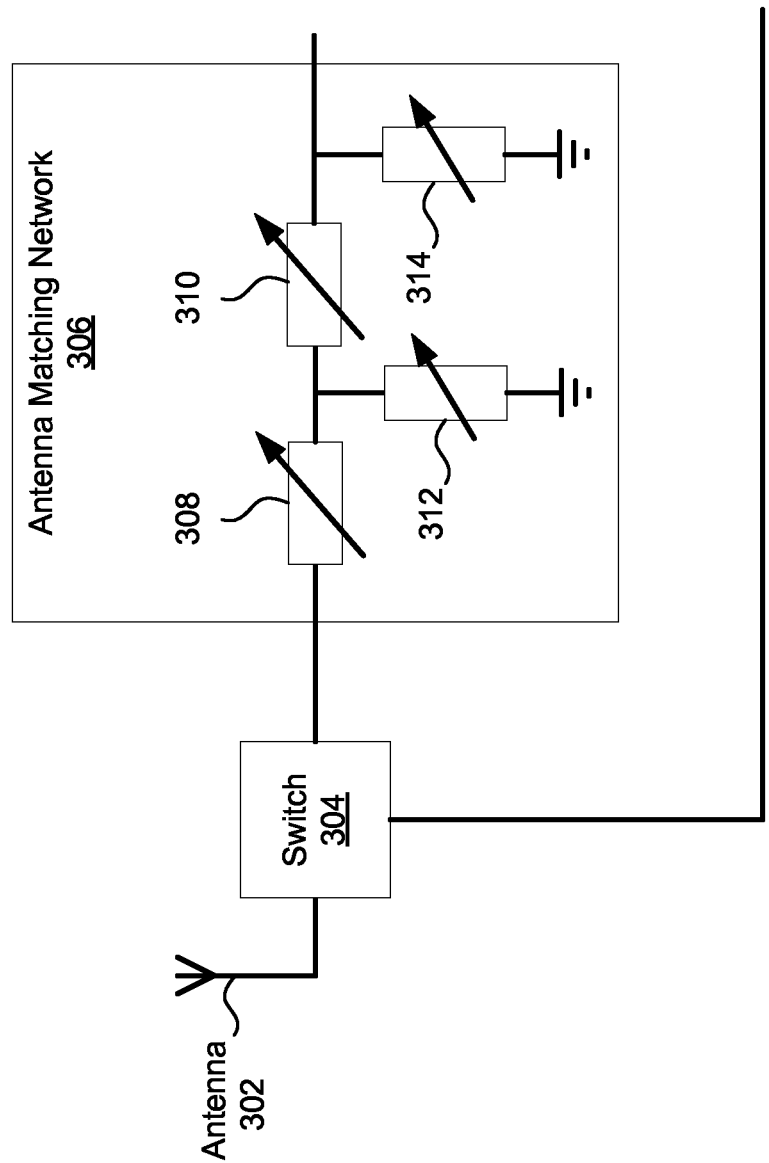
FIG. 3 is a block diagram of an antenna matching network according to one embodiment.

FIG. 3 is a block diagram of an antenna matching network 306 according to one embodiment. The antenna matching network 306 is connected to an antenna 302 via a switch 304. Switch 304 may be a single pole double throw (SPDT) switch or other type of switch, and may be used to connect or disconnect antenna matching network 306 to antenna 302. In one embodiment, switch 304 may be used to bypass antenna matching network 306, such as in instances where antenna matching network 306 is not to be used (e.g., if antenna 302 is optimized for connection to a WLAN transceiver and is to be connected to such a WLAN transceiver).

In one embodiment, antenna matching network 306 is a reconfigurable antenna matching network. Alternatively, antenna matching network may be a fixed configuration antenna matching network. Antenna matching network 306 includes one or more capacitors and/or inductors 308, 310 in a path to a receiver or transceiver. Antenna matching network 306 additionally includes one or more inductors and/or capacitors 312, 314 that connect the electrical path to ground. The ground may be a connection to a metal frame of the user device. These capacitors and inductors may be variable inductors and capacitors (as shown), enabling antenna matching network 306 to be reconfigurable. Alternatively, the inductors and capacitors may have fixed values.

Figure 4:
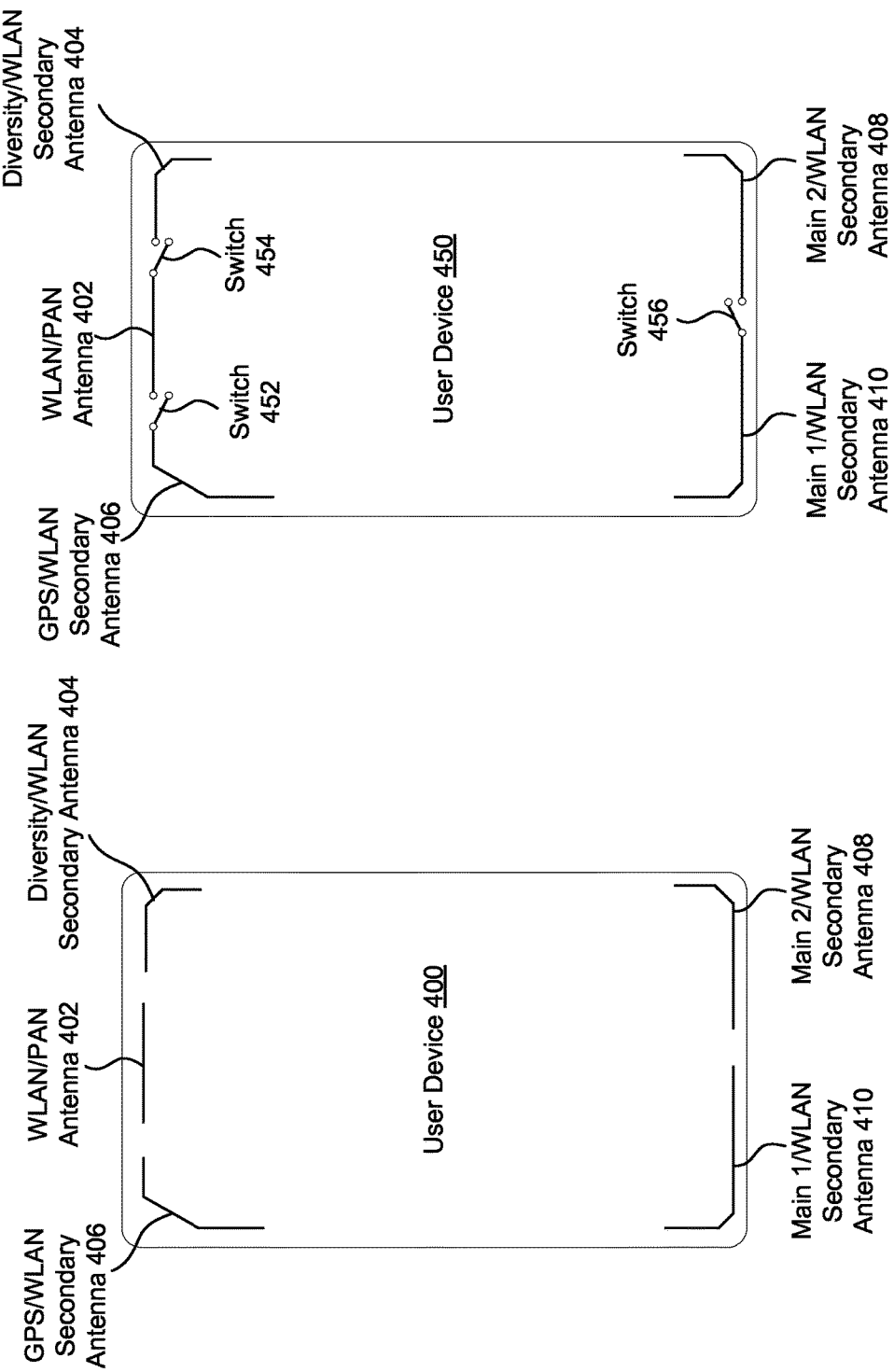
FIG. 4A is a block diagram of a user device with multiple switchable antennas according to one embodiment.
FIG. 4B is a block diagram of another user device with multiple switchable antennas according to one embodiment.

In some embodiments, as discussed above, each antenna may be switchable to any of the available wireless modules. In other embodiments, particular antennas may be switchable between only a few wireless modules (e.g., less than all of the wireless modules). FIGS. 4A-4B illustrate a few examples of such embodiments.

FIG. 4A is a block diagram of a user device 400 with multiple switchable antennas according to one embodiment. In one embodiment, an antenna is switchable between a GPS receiver and a WLAN transceiver. Accordingly, the antenna is referred to as a GPS/WLAN secondary antenna 406. In one embodiment, an antenna is switchable between a PAN receiver and a WLAN transceiver. Accordingly, the antenna is referred to as a WLAN/PAN antenna 402. In one embodiment, an antenna is switchable between a diversity receiver of a WAN wireless module and a WLAN transceiver. Accordingly, the antenna is referred to as a diversity/WLAN secondary antenna 404. In one embodiment, an antenna is switchable between a main transceiver of a WAN wireless module and a WLAN transceiver. Accordingly, the antenna is referred to as a main 1/WLAN secondary antenna 410. In one embodiment, an antenna is switchable between a main transceiver of a WAN wireless module and a WLAN transceiver. Accordingly, the antenna is referred to as a main 2/WLAN secondary antenna 408. Each of the antennas may be connected to an antenna selector (not shown) that may determine which wireless module to switch each antenna to at any given time.

FIG. 4B is a block diagram of another user device 450 with multiple switchable antennas according to one embodiment. User device 450 contains the same switchable antennas as shown in user device 400. However, user device 450 further includes switches 452, 454, 456. Switch 452 may electrically connect GPS/WLAN secondary antenna 406 to WLAN/PAN antenna 402. Similarly, switch 454 may electrically connect WLAN/PAN antenna 402 to diversity/WLAN secondary antenna 404. Similarly, switch 456 may electrically connect main 1/WLAN secondary antenna 410 to main 2/WLAN secondary antenna 408. When GPS/WLAN secondary antenna 406, WLAN/PAN antenna 402 and diversity/WLAN secondary antenna 404 are all electrically connected, they may form a single longer antenna that may be used as a LB main 1 secondary antenna for the WAN module. Similarly, when main 1/WLAN secondary antenna 410 is connected to main 2/WLAN secondary antenna 408, they may form a single longer antenna that may be used as a LB main 1 primary antenna for the WAN module.

FIGS. 5-8 are flow diagrams showing various methods of implementing a switchable antenna framework on a user device. The methods may be performed by a processing logic that may comprise hardware (e.g., circuitry, dedicated logic, programmable logic, microcode, etc.), software (e.g., instructions run on a processing device to perform hardware simulation), or a combination thereof. Various embodiments may be performed by an antenna selector of a user device, such as user device 905 of FIG. 9.

Figure 5:
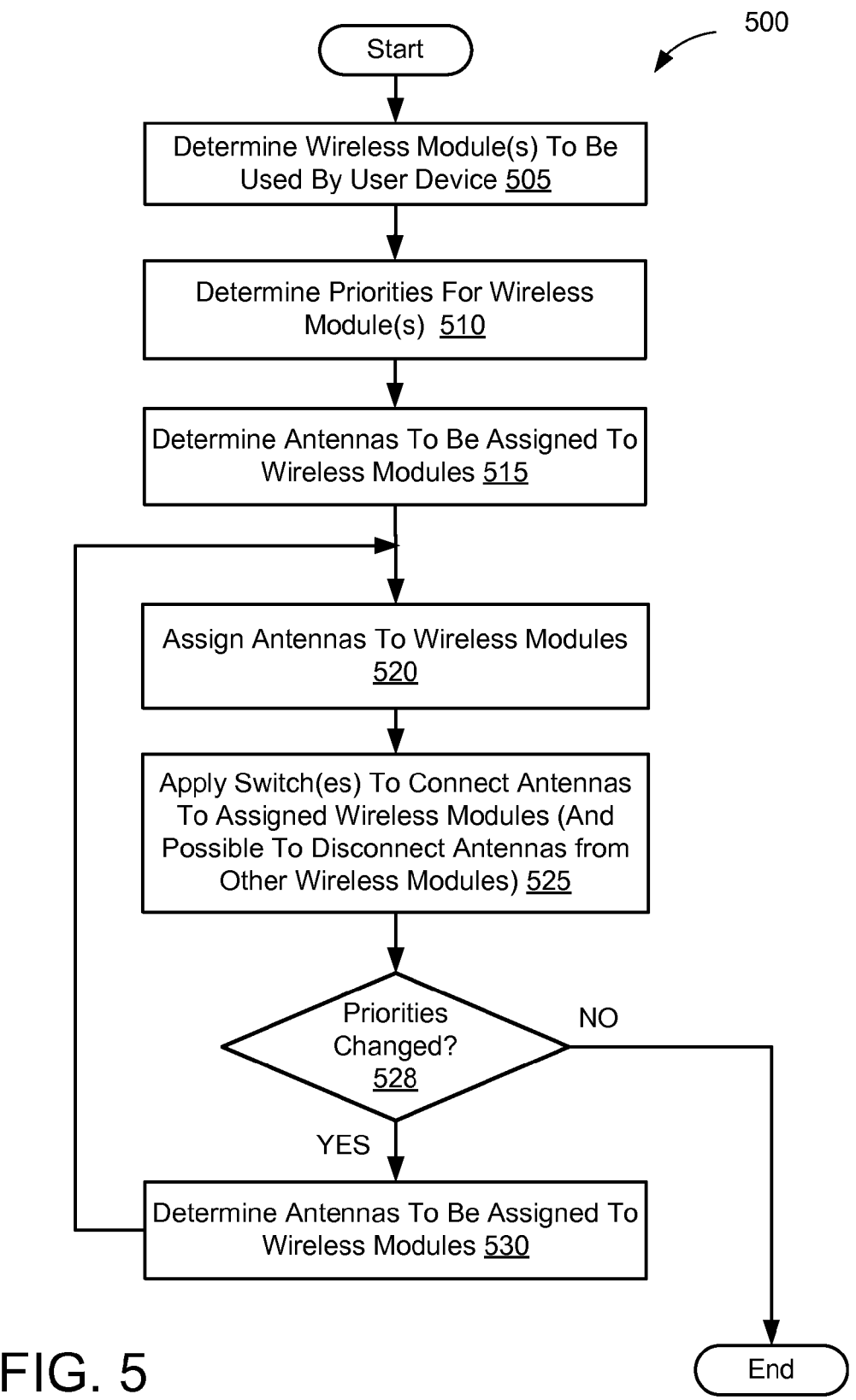
FIG. 5 is a flow diagram of one embodiment for a method of sharing antennas between wireless modules based on antenna switching.

FIG. 5 is a flow diagram of one embodiment for a method 500 of sharing antennas between wireless modules based on antenna switching. At block 505 of method 500, processing logic determines wireless modules that are to be used by a user device. This may include determining what applications are running on the user device and further determining what, if any, wireless services are relied upon by the applications. This may also include determining if a phone call is in session, whether WLAN calling is enabled, whether the user device has a connection to a WLAN access point, whether the user device is paired to any other devices via a PAN (e.g., Bluetooth or Zigbee) or another wireless connection protocol, and so on. This may additionally include determining if any wireless modules are idle or otherwise underutilized and/or if any transceivers or receivers of any wireless modules (and the antennas connected to those transceivers or receivers) are idle or otherwise underutilized. A transceiver, receiver or wireless module may be underutilized if it is only minimally used (e.g., to check a connection status) or is not being used for any user communications.

The user device may include multiple wireless modules, such as a WAN module (e.g., an LTE module), a WLAN module (e.g., a Wi-Fi module), a PAN module, a GPS receiver, and so on. At block 510, processing logic determines priorities for each of the wireless modules. The priorities may be determined based on numerous factors, which may include any of the information received or determined at block 505. In one embodiment, a low priority may be determined for a wireless module if that wireless module has been underutilized or idle for a threshold amount of time (e.g., a few seconds, a few minutes, or other amount of time). A low priority may also be determined for a particular transceiver of a wireless module if an antenna connected to that transceiver has been underutilized or idle for a threshold amount of time. Priorities may also be determined based on other information, such as whether the WLAN module and/or WAN module support antenna diversity or higher order MIMO. Other information may also be received or determined and used for prioritization, such as a signal strength for WAN signals and/or WLAN signals, a connection status (connection state) to a WAN base station and/or WLAN wireless access point, location, and so on. The connection state may indicate whether the WLAN module or WAN module is able to send and receive data packets to a remote device (e.g., to a WLAN access point). If the WLAN module is in a connected state, for example, then exchange of packets may be possible. If the WLAN module is in a disconnected state, then it may not be able to send or receive data packets from any WLAN access point. This information may also be used to determine priorities. The priorities may specify a preference order for communications by the user device when the user device is connected to a WLAN and a WAN.

Antenna diversity is a communication scheme that uses two or more antennas to improve the quality, reliability, or both of a wireless link. When communicating with some antenna radio technologies, a specification may indicate when diversity is to be used, such as when communicating certain types of data. Alternatively, the user device can specify the conditions when diversity should be used or not for communications.

In one embodiment, the processing logic determines whether a WAN connection is idle (idle state) or connected (connected state), and determines whether a call (or other communication) using the connected WAN connection should use diversity. While in an idle state, a WAN module may periodically send and receive data from a base station of a wireless carrier. However, in the connected state more frequent data exchanges (e.g., packets) may be exchanged. One example of a connected state for LTE is an LTE connected mode discontinuous reception (DRX). A lower priority may be assigned to a WAN module when the call (or other communication) will not use diversity or the WAN connection is idle. A higher priority may be assigned to the WAN module when a call (or other communication) would benefit from diversity or the WAN connection is connected.

In another embodiment, determining prioritization includes determining whether the user device is located in a defined area where WLAN communication is preferred. For example, a geo-fence can be used to define the area where WLAN communication is preferred. The geo-fence can be specified by a user or may be adaptively learned by the user device. The processing logic also determines if there is WLAN connectivity. The processing logic may assign a lower priority to the WLAN module when the user device is not located within the defined area or there is no WLAN connectivity. The processing logic may assign a higher priority to the WLAN module when the user device is located within the defined area and there is WLAN connectivity (e.g., when the user device authenticates successfully to a WLAN).

At block 515, processing logic determines which antennas are to be assigned to which wireless modules based on the determined priorities. In other words processing logic determines an antenna configuration for the antennas of the user device. More antennas and/or better antennas may be assigned to wireless modules with higher priorities. As used herein, a "better" antenna for a wireless module is an antenna sized and/or tuned for optimal operation at a frequency band used by that wireless module. In one embodiment, processing logic applies one or more antenna selection rules to determine which antennas to switch to which wireless modules. Each antenna selection rule may include various switching criteria and/or configuration criteria, and may apply the priorities and/or received information to the criteria to determine which configuration to select and thus which antennas to connect to which wireless modules. In one embodiment, satisfaction of first criteria causes a switch to connect a first wireless module to a first antenna. Satisfaction of second criteria may cause the first antenna to be connected to a second wireless module. For example, if a user device is connected to a WLAN and has a signal strength to the WLAN that exceeds a signal strength threshold, first selection criteria may be satisfied. As a result a first configuration may be selected and an antenna may be assigned to a WLAN module. However, if the user device is not connected to any WLAN or has a signal strength that is below the signal strength threshold, a packet loss that is above a packet loss threshold, etc. with a WLAN to which it is connected, second criteria may be satisfied. As a result, a second configuration may be selected and the antenna may be assigned to a WAN module.

At block 520, processing logic assigns the antennas to the wireless modules as per the determination at block 515. Depending on the determined priorities, different antenna assignments may be determined. In one embodiment, under certain circumstances (e.g., if there is WLAN connectivity with a strong signal), the processing logic switches into a WLAN MIMO mode. In WLAN MIMO mode, a maximum number of usable antennas will be assigned to the WLAN module. In one embodiment, under certain circumstances (e.g., if the user device is not in an area where WLAN is preferred or there is no WLAN connectivity) the processing logic switches into a cellular MIMO mode. In the cellular MIMO mode, a maximum number of usable antennas will be assigned to the WAN module.

At block 525, processing logic applies one or more switches to connect the antennas to the assigned wireless modules. This may include disconnecting the antennas from other wireless modules to which the antennas were previously connected. This may also include connecting a fixed or reconfigurable antenna matching network to the antenna or wireless module on a transmit/receive path between the antenna and wireless module. The antenna matching network may tune the antenna to a frequency band used by the wireless module (e.g., if the antenna is sized for operating in a frequency band other than the frequency band used by the wireless module).

At block 528, processing logic determines if the priorities assigned to the wireless modules have changed. Priorities may change as conditions for the user device change. For example, priorities may change when a user receives a phone call or terminates a phone call. Priorities may also change when a user connects to a WLAN or disconnects from a WLAN. Priorities may also change when a user begins using an application that uses a location service (e.g., that relies on GPS). Many other events may also cause the priorities to change. If the priorities remain unchanged, the method ends. If the priorities change, the method continues to block 530 and processing logic re-determines which antennas are to be assigned to which wireless modules. The method then returns to block 520.

Figure 6:
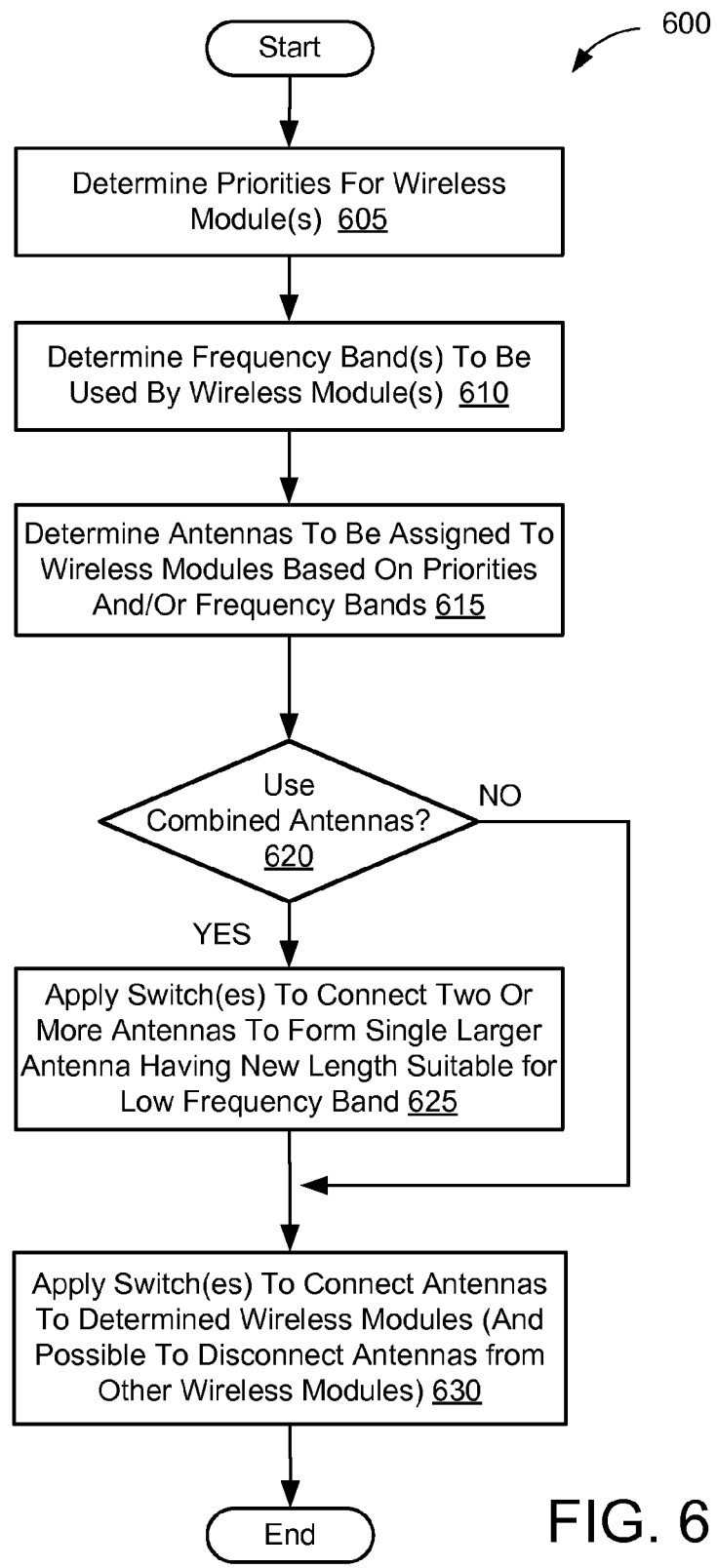
FIG. 6 is a flow diagram of another embodiment for a method of sharing antennas between wireless modules based on antenna switching.

FIG. 6 is a flow diagram of another embodiment for a method 600 of sharing antennas between wireless modules based on antenna switching. At block 605 of method 600, processing logic determines priorities for each of its wireless modules. The priorities may be determined based on numerous factors, as described with reference to method 500.

At block 610, processing logic determines frequency bands to be used by one or more wireless modules. For example, processing logic may determine if HB, MB or LB frequencies are to be used by a wireless module. At block 615, processing logic determines antennas to be assigned to the wireless modules based on the priorities and/or the determined frequency bands.

At block 620, processing logic determines whether to combine any of the antennas to form a single larger antenna (e.g., for communicating using a lower resonant frequency).

If no antennas are to be combined, the method proceeds to block 630. If one or more antennas are to be combined, the method continues to block 625.

At block 625, processing logic applies one or more switches to electrically connect two or more antennas to form a single larger antenna having a new length suitable for a low (or lower) frequency band. At block 630, processing logic applies one or more switches to connect the antennas to the assigned wireless modules. This may include disconnecting the antennas from other wireless modules to which the antennas were previously connected.

Figure 7:
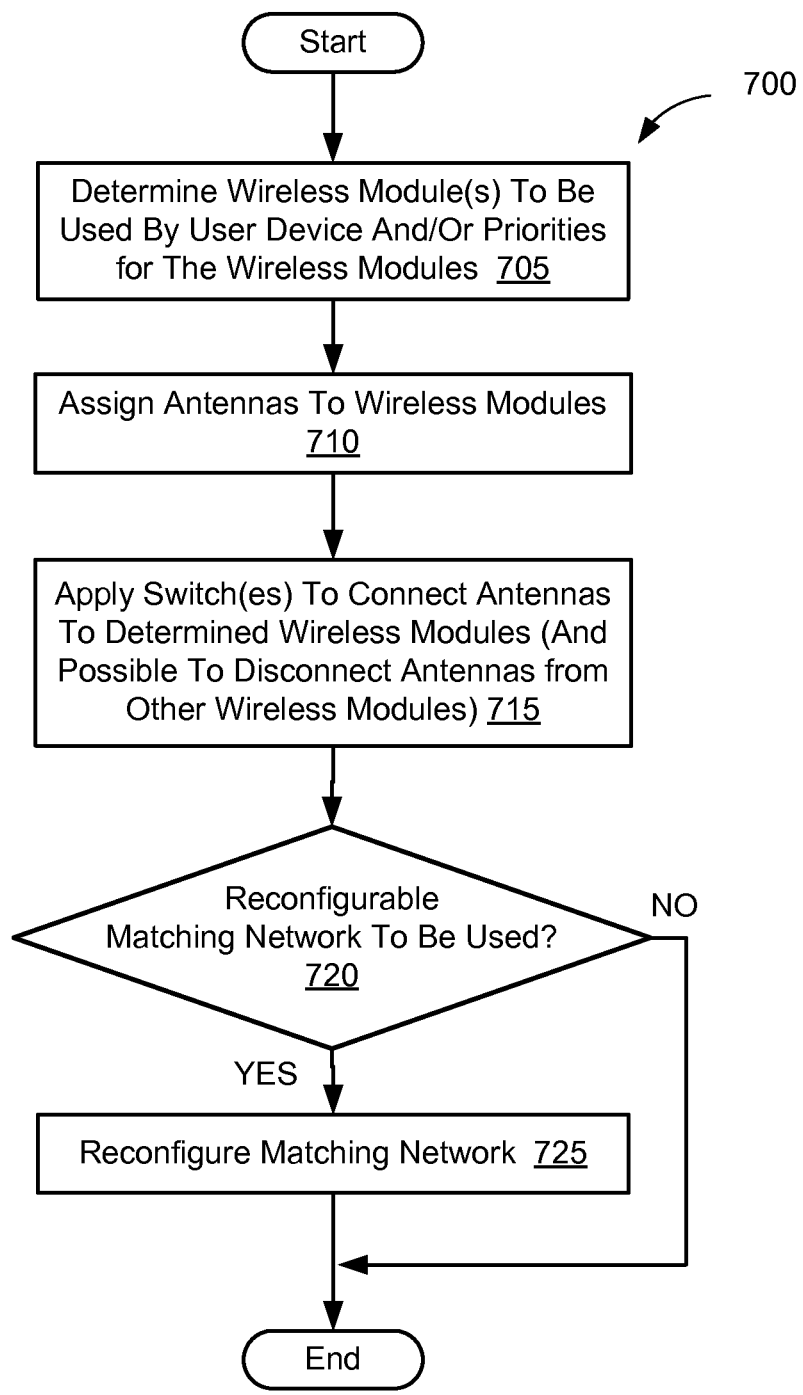
FIG. 7 is a flow diagram of another embodiment for a method of sharing antennas between wireless modules based on antenna switching.

FIG. 7 is a flow diagram of one embodiment for a method 700 of sharing antennas between wireless modules based on antenna switching. At block 705 of method 700, processing logic determines wireless modules to be used by a user device and/or priorities for those wireless modules. The priorities may be determined based on numerous factors, as described with reference to method 500.

At block 710, processing logic determines antennas to be assigned to the wireless modules based on the priorities and/or the determined frequency bands and assigns the antennas to the wireless modules. At block 715, processing logic applies one or more switches to connect the antennas to the assigned wireless modules. This may include disconnecting the antennas from other wireless modules to which the antennas were previously connected.

At block 720, processing logic determines whether a reconfigurable antenna matching network is to be used for tuning a resonant frequency of one or more antennas to a frequency range used by a wireless module. If a reconfigurable antenna matching network is to be used, the method continues to block 725 and the reconfigurable antenna matching network is reconfigured to tune the antenna to the frequency range used by the wireless module. Otherwise the method ends.

It should be noted that the antennas described herein can be designed to cover multiple bands, such as the eight-band LTE/GSM/UMTS, the GSM850/900/1800/1900/UMTS penta-band operation, the LTE700/GSM850/900 (698-960 MHz) operation, the GSM 1800/1900/UMTS operation, the LTE 2300/2500 operation, and so forth. Antennas may also support a three component carrier aggregation in embodiments. In the user device context, one purpose of doing so is to support roaming between different regions whose infrastructure cannot support mobile services in the same frequency range. These frequency bands may be Universal Mobile Telecommunication Systems (UMTS) frequency bands, GSM frequency bands, or other frequency bands used in different communication technologies, such as, for example, cellular digital packet data (CDPD), general packet radio service (GPRS), enhanced data rates for GSM evolution (EDGE), 1 times radio transmission technology (1×RTT), evaluation data optimized (EVDO), high-speed downlink packet access (HSDPA), Wi-Fi®, WiMax, etc. In other embodiments, the RF front-end circuitry can be used in various target bands, such as, for examples: 1) Verizon LTE band: 746 to 787 MHz; 2) US 850 (band 5): 824 to 894 MHz; 3) GSM900 (band 8): 880 to 960 MHz; 4) GSM 1800/DCS: 1.71 to 1.88 GHz; 5) US1900/PCS (band 2): 1.85 to 1.910 GHz; and 6) WCDMA band I (band 1): 1.92 to 2.17 GHz.

Figure 8:
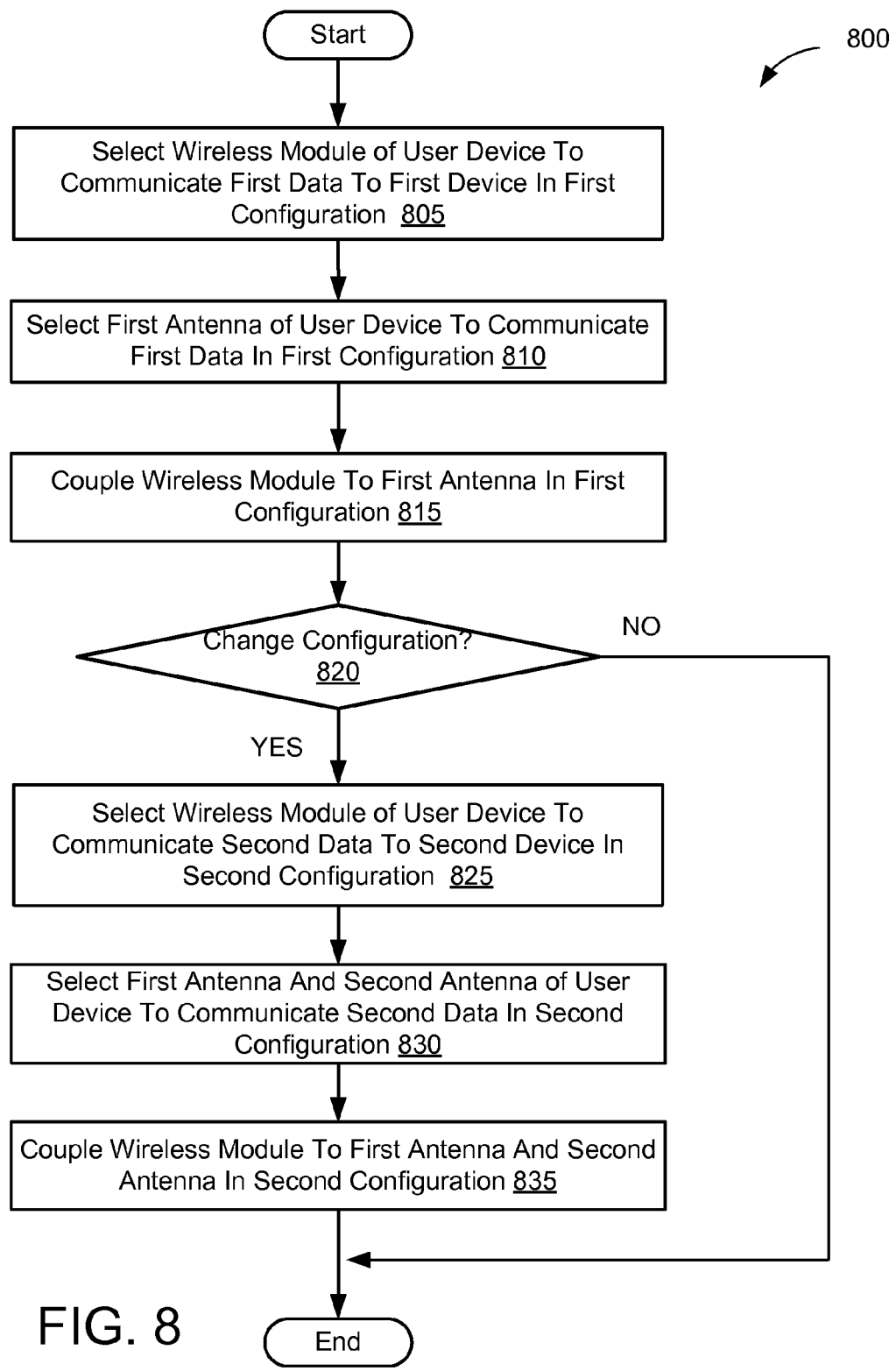
FIG. 8 is a flow diagram of another embodiment for a method of sharing antennas between wireless modules based on antenna switching.

FIG. 8 is a flow diagram of another embodiment for a method 800 of sharing antennas between multiple wireless modules of a user device based on antenna switching. At block 805 of method 800, processing logic selects a wireless module of a user device to communicate first data to a first device in a first configuration. The first device may be a WLAN access point, a WAN base station, another user device, or other device. The first configuration is a first antenna configuration of a bank of antennas. The first device may additionally or alternatively be a specific transmitter, transceiver or receiver of such a WLAN access point, WAN based station or other user device. At block 810, processing logic selects a first antenna of the user device to communicate the first data in the first configuration. At block 815, processing logic couples the wireless module to the first antenna. This may be accomplished by causing a switch to decouple an additional wireless module from the first antenna and to couple the wireless module to the first antenna.

In one embodiment, for the first configuration an additional wireless module of the user device is additionally selected to communicate additional data to an additional device. A second antenna of the user device may be selected to communicate the additional data in the first configuration. Additionally, the additional wireless module may be coupled to the additional antenna in the first configuration.

At block 820, processing logic determines whether the configuration should be changed. In one embodiment, a determination of whether to change the configuration is made based on received data and/or based on determined priorities of the multiple wireless modules of the user device. Received data may include a signal strength and/or connection status to a WAN, and may additionally or alternatively include a signal strength and/or connection status to a WLAN. Received data may also include a location of the user device, information on applications running on the user device (e.g., information identifying whether any executing applications use location services), and/or other data.

In one embodiment, processing logic determines a priority for the wireless module and additionally determines priorities for other wireless modules of the user device. Processing logic may determine that the configuration should change if a priority of the wireless module has increased relative to priorities of one or more other wireless modules. For example, the wireless module may be a WLAN module, and the priority for the WLAN module may increase if a signal strength to a WLAN increases and/or if a connection is established with a WLAN (e.g., has a connected state). In another example, the wireless module may be a WAN module, and the priority for the WAN module may increase relative to a priority of a WLAN module if a connection status of the WLAN module to a WLAN indicates that a connection has dropped (e.g., has a disconnected state) and/or if a signal quality to the WLAN has degraded. If the configuration is not to change, the method ends. If the configuration is to change, the method continues to block 825.

At block 825, processing logic selects the wireless module to communicate second data to a second device in a second configuration. The second configuration is a second antenna configuration of the bank of antennas. At block 830, processing logic selects the first antenna and the second antenna of the user device to communicate the second data in the second configuration. At block 835, processing logic couples the wireless module to the first antenna and to the second antenna. This may be accomplished by causing a switch to decouple one or more additional wireless modules from the second antenna and to couple the wireless module to the second antenna.

In one embodiment, the wireless module supports MIMO. The wireless module may include a first transceiver, transmitter or receiver that couples to the first antenna and may additionally include a second transceiver, transmitter or receiver that couples to the second antenna. These separate transceivers, for example, may operate together to provide the MIMO capability to improve a bandwidth and/or signal quality of a wireless connection.

The wireless module may use a first frequency band (e.g., may be configured to radiate electromagnetic energy in a first frequency band). However, a length of the second antenna may correspond to a second frequency band used by another wireless module. In such an instance, coupling the wireless module to the second antenna in the second configuration may include coupling an antenna matching network to the wireless module, wherein the antenna matching network tunes the second antenna to the first frequency band used by the wireless module. The antenna matching network may be disposed on a transmit/receive path between the second antenna and the wireless module. The antenna matching network may be a fixed antenna matching network or may be a reconfigurable antenna matching network. If the antenna matching network is a reconfigurable antenna matching network, processing logic may adjust the reconfigurable antenna matching network to tune the second antenna to the second frequency band.

Another technique that may be used to adjust the frequency band of the second antenna is to couple the second antenna to a third antenna of the user device. This may have the effect of reducing the frequency band for the combined second and third antennas. In one embodiment, for the second configuration a third antenna is coupled to the second antenna to radiate electromagnetic energy in the first frequency band used by the wireless module. A length of the second antenna may correspond to a second frequency band used by another wireless module, but the effective length of the combined second and third antenna, when coupled, may correspond to the first frequency band. In one embodiment, the effective length of the second and third antenna is a sum of a second length of the second antenna and a third length of the third antenna. When the second length and the third length are combined, this combined length may be resonant at a lower frequency, which may correspond to the frequency of the first frequency band. Accordingly, an impedance of the combined length of the antennas may be approximately matched to an impedance associated with a particular frequency band.

In some embodiments, the antenna matching network may be added to the signal path between the wireless module and the coupled antennas. Thus, the antennas may be electrically coupled together to cause their combined length to have close to a resonant frequency of the first frequency band, and the antenna matching network may be used to further tune the resonant frequency for the combined antennas. Note that more than two antennas may be coupled in this manner. For example, three or even four HB and/or MB antennas may be coupled to effectively create a LB antenna. The more antennas that are combined, the longer the combined length of the resultant antenna structure.

Figure 9:
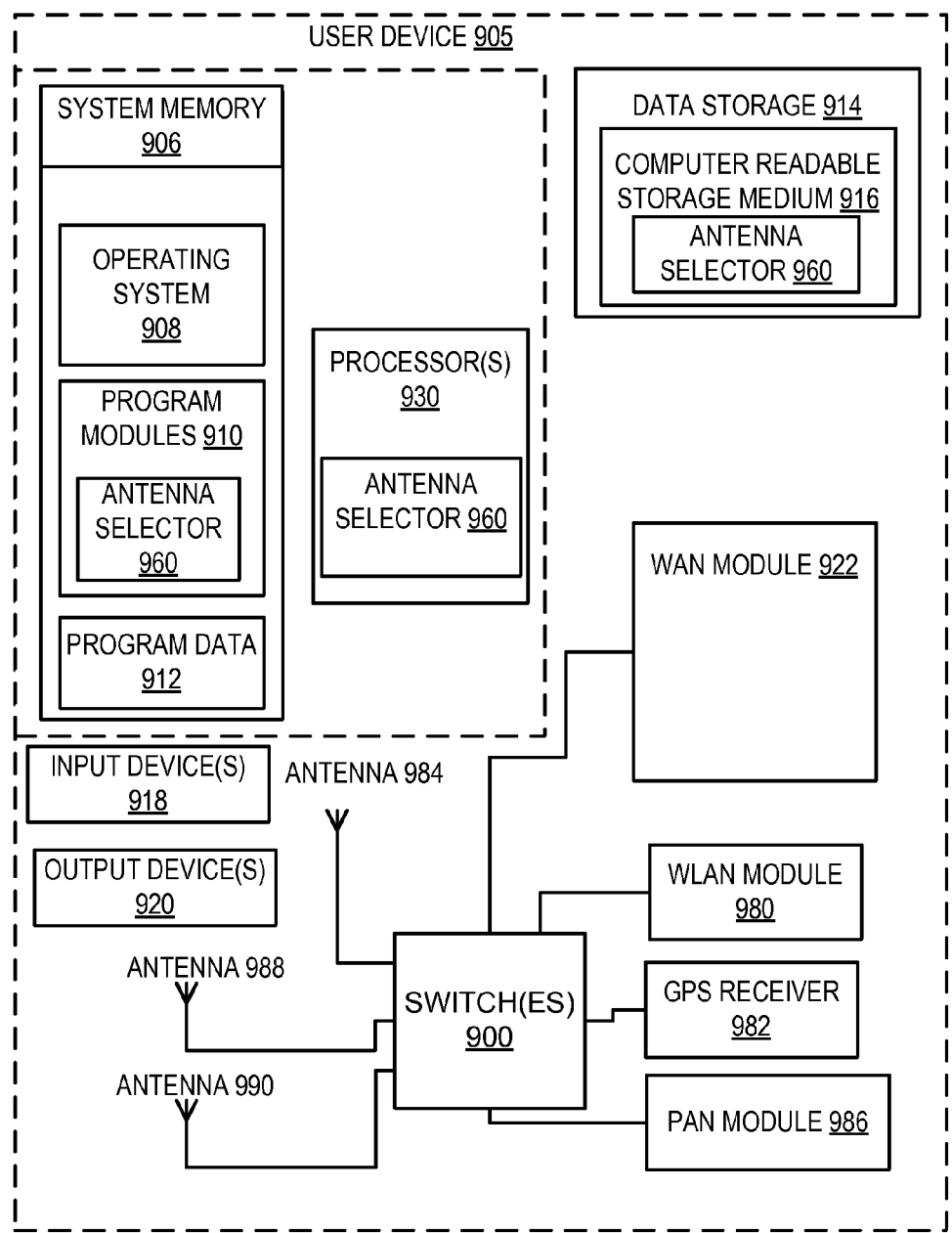
FIG. 9 is a block diagram illustrating one embodiment of a user device including switchable antennas and an antenna selector.

FIG. 9 is a block diagram illustrating one embodiment of an exemplary user device 905 including a switchable antenna architecture with one or more switches 900 and an antenna selector 960. The antenna selector 960 may be implemented as hardware, firmware and/or software. The user device 905 may correspond to the user device 1005 of FIG. 9 and may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The switches 900 may be the switches 140 as described above. Similarly, the antenna selector 960 may correspond to antenna selector 152 as described above.

The user device 905 includes one or more processor(s) 930, such as one or more CPUs, microcontrollers, field programmable gate arrays, or other types of processors. The user device 905 also includes system memory 906, which may correspond to any combination of volatile and/or non-volatile storage mechanisms. The system memory 906 stores information that provides operating system component 908, various program modules 910 such as antenna selector 960, program data 912, and/or other components. The user device 905 performs functions by using the processor(s) 930 to execute instructions provided by the system memory 906.

The user device 905 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. As shown, instructions for the antenna selector 960 may reside, completely or at least partially, within the computer-readable storage medium 916, system memory 906 and/or within the processor(s) 930 during execution thereof by the user device 905, the system memory 906 and the processor(s) 930 also constituting computer-readable media. The user device 905 may also include one or more input devices 918 (keyboard, mouse device, specialized selection keys, etc.) and one or more output devices 920 (displays, printers, audio output mechanisms, etc.).

The user device 905 further includes a WAN module 922 to allow the user device 905 to communicate via a wireless network (e.g., such as provided by the wireless communication system) with other computing devices, such as remote computers, an item providing system, and so forth. The WAN module 1022 allows the user device 1005 to handle both voice and non-voice communications (such as communications for text messages, multimedia messages, media downloads, web browsing, etc.) with the wireless communication system 1010 (or 1012) of FIG. 10. The WAN module 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The WAN module 922 may generate signals and send these signals to antenna 984, antenna 988, and/or antenna 990 via switches 900. User device 905 may additionally include a WLAN module 980, a GPS receiver 982, a PAN transceiver 986 and/or other wireless modules. These wireless modules 980, 982, 986 may additionally or alternatively be connected to one or more of antennas 984, 988, 990 via switches 900. Antenna selector 960 may determine which wireless modules 922, 980, 982, 986 to connect to which antennas 984, 988, 990 and control switches 140 to connect the various wireless modules to allocated antennas. Antennas 984, 988, 990 may be configured to transmit in different frequency bands and/or using different wireless communication protocols. The antennas 984, 988, 990 may be directional, omnidirectional, or non-directional antennas. In addition to sending data, antennas 984, 988, 990 may also receive data, which is sent to appropriate wireless modules connected to the antennas.

Figure 10:
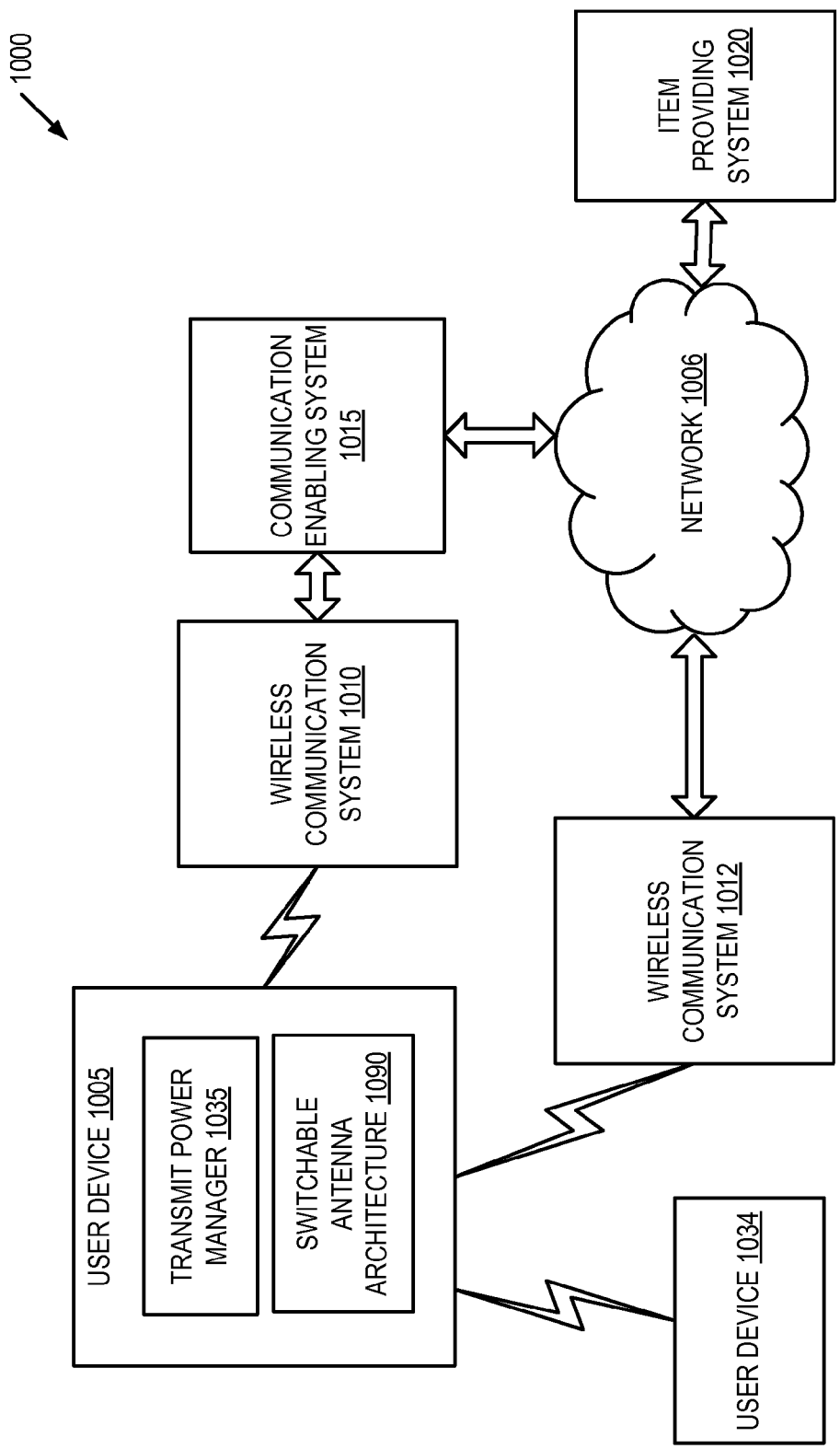
FIG. 10 is a block diagram of an example network architecture in which user devices with switchable antennas may operate in embodiments.

FIG. 10 is a block diagram of an exemplary network architecture 1000 in which embodiments of user device 1005 with a switchable antenna architecture 1090 may operate. The network architecture 1000 may include an item providing system 1020 and one or more user devices 1005 capable of communicating with the item providing system 1020 via a network 1006 (e.g., public network such as the Internet or private network such as a local area network (LAN)). The user device 1005 includes a switchable antenna architecture 1090 including an antenna selector and one or more switches.

The user devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The item providing system 1020 and the user devices 1005 deliver and/or receive items, upgrades, and/or other information via the network 1006. For example, the user devices 1005 may download or receive items from the item providing system 1020. The item providing system 1020 also receives various requests, instructions and other data from the user devices 1005 via the network 1006. The item providing system 1020 may include one or more machines (e.g., one or more server computer systems, routers, gateways, etc.) that have processing and storage capabilities to provide the above functionality.

Communication between the item providing system 1020 and the user device 1005 may be enabled via any communication infrastructure. One example of such an infrastructure includes a combination of a wide area network (WAN) and wireless infrastructure, which allows a user to use the user device 1005 to purchase items and consume items without being tethered to the item providing system 1020 via hardwired links. The wireless infrastructure may be provided by one or multiple wireless communications systems, such as wireless communications system 1010 and wireless communication system 1012. One of the wireless communication systems 1010, 1012 may be a Wi-Fi® hotspot connected with the network 1006. Another of the wireless communication systems 1010, 1012 may be a wireless carrier system that can be implemented using various data processing equipment, communication towers, etc. Alternatively or additionally, the wireless carrier system may rely on satellite technology to exchange information with the user device 1005.

The communication infrastructure may also include a communication-enabling system 1015 that serves as an intermediary in passing information between the item providing system 1020 and the wireless communication system 1010. The communication-enabling system 1015 may communicate with the wireless communication system 1010 (e.g., a wireless carrier) via a dedicated channel, and may communicate with the item providing system 1020 via a non-dedicated communication mechanism, e.g., a public Wide Area Network (WAN) such as the Internet.

In one embodiment, while the user device 1005 is connected with the wireless communication system 1010 and/or wireless communication system 1012, the wireless communication system periodically or continuously specifies transmit power levels for the user device 1005 to use for transmissions to that wireless communication system 1010, 1012. For example, conventional wireless carrier systems dictate what transmit power levels mobile phones are to use for communications with the wireless carrier systems. The transmit power levels that the wireless carrier systems specify continuously vary based on environmental factors such as a current signal to noise ratio, distance between the mobile phone and a nearest cell tower, obstacles between the mobile phone and the nearest cell tower, and so on.

In addition to wirelessly connecting to a wireless communication system 1010, 1012, the user device 1005 may also wirelessly connect with other user devices (e.g., user device 1034). For example, user device 1005 may form a wireless ad hoc (peer-to-peer) network with user device 1034.

In one embodiment, the user device 1005 includes a transmit power manager 1035. The transmit power manager may control transmit power levels used to communicate with the wireless communication systems 1010, 1012 and with other user devices 1034. In one embodiment, transmit power manager 1035 applies equal power (e.g., maximum or optimal power) to all transmitters of a wireless module with MIMO capabilities. This may provide maximum throughput capacity for the wireless module. Alternatively, transmit power manager 1035 may spread a transmit power over multiple transmitters to reduce interference (e.g., with each transmitter receiving less than the maximum or optimal power). In another embodiment, the transmit power manager 1035 may apply a water filling algorithm to determine how much power to transmit to each transmitter of a MIMO capable wireless module. Using the water filling algorithm, the transmit power manager may prioritize the antennas based on signal quality for each of the antennas, and may then apply a maximum power first to the antenna with the highest priority, then to the antenna with the next highest priority, and so on. This may be repeated until all available power is used up.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "applying," "adjusting," "detecting," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The structure for a variety of these systems will appear from the description above. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by an antenna selector executing on a user device, signal strength data for a connection to a wireless local area network (WLAN) using a first antenna coupled to a WLAN module of the user device;
   determining, based on the signal strength data, that a signal strength of the connection between the WLAN module and WLAN exceeds a threshold value;
   determining that a transceiver of a wide area network (WAN) module coupled to a second antenna is idle;
   causing, by the antenna selector, disconnection of the WAN module from the second antenna;
   causing, by the antenna selector, connection of the WLAN module to the second antenna;
   determining that an additional wireless module is idle; and causing, by the antenna selector, decoupling of the additional wireless module from a third antenna and coupling of the WLAN module to the third antenna.

2. The method of claim 1, further comprising:
receiving new data indicating a disconnection of the WLAN module from the WLAN;
determining a new first priority for the WAN module and a new second priority for the WLAN module using the new data, wherein the new second priority is lower than the new first priority; and
causing disconnection of the WLAN module from the second antenna and connection of the WAN module to the second antenna.

3. The method of claim 1, wherein assigning the second antenna to the WLAN module comprises coupling the third antenna to the second antenna to radiate electromagnetic energy in a first frequency band, wherein a length of the first antenna causes a first impedance that is matched to a second frequency band and a combined length of the third antenna and the second antenna causes a second impedance that is matched to the first frequency band.

4. A method comprising:
selecting, by a user device, a first communication module from a plurality of communication modules of the user device to transmit first data, the first communication module being coupled to a first antenna, wherein the first communication module has a first priority;
determining, by the user device, that a second communication module, from the plurality of communication modules, has a second priority that is lower than the first priority and that the second communication module is not transmitting or receiving data, the second communication module being coupled to a second antenna;
decoupling, by the user device, the second antenna from the second communication module; and
coupling, by the user device, the second antenna to the first communication module.

5. The method of claim 4, wherein the first antenna and the second antenna are coupled to the first communication module in a first configuration, and wherein the first antenna is coupled to the second communication module and the second antenna is coupled to the first communication module in a second configuration.

6. The method of claim 4, wherein determining the first priority for the first communication module comprises determining a signal strength and a connection status associated with the first communication module, the first priority being based on the connection status and the signal strength, and wherein the second priority for the second communication module is based on a status of the second communication module.

7. The method of claim 4, further comprising:
determining a signal strength of the first communication module over the first antenna;
determining whether the signal strength exceeds a threshold; and
coupling the first communication module to the second antenna responsive to determining that the signal strength exceeds the threshold.

8. The method of claim 4, wherein the first antenna has a length that causes the first antenna to have a first impedance that corresponds to a second frequency band used by the second communication module but does not cause the first antenna to have a second impedance that corresponds to a first frequency band used by the first communication module, and wherein coupling the first communication module to the first antenna further comprises coupling an antenna matching network to the first communication module, wherein the antenna matching network tunes a third impedance of the first antenna to the first frequency band used by the first communication module.

9. The method of claim 4, further comprising:
selecting a third communication module from the plurality of communication modules of the user device to transmit second data;
selecting a third antenna of the user device to transmit the second data; and
coupling the third communication module to the third antenna.

10. The method of claim 4, further comprising
coupling a third antenna to the first antenna to radiate electromagnetic energy in a first frequency band used by the first communication module, wherein a length of the first antenna causes an impedance that is matched to a second frequency band and a combined length of the third antenna and the first antenna causes an impedance that is approximately matched to the first frequency band.

11. The method of claim 4, further comprising:
determining that the first antenna has been idle for a threshold amount of time.

12. A user device comprising:
a plurality of antennas;
a plurality of communication modules;
one or more switching devices; and
a processing device to:
select a first communication module from the plurality of communication modules of the user device to transmit first data, the first communication module being coupled to a first antenna of the plurality of antennas;
determine that a second communication module from the plurality of communication modules is not transmitting or receiving data, the second communication module being coupled to a second antenna of the plurality of antennas;
decouple the second antenna from the second communication module; and
couple the second antenna to the first communication module,
wherein the first antenna and the second antenna are coupled to the first communication module in a first configuration, and wherein the first antenna is coupled to the second communication module and the second antenna is coupled to the first communication module in a second configuration.

13. The user device of claim 12, wherein the second communication module supports multiple-input multiple-output (MIMO) communications, and wherein, for the second configuration, the processing device is further to select the second communication module to communicate second data, select the second antenna to communicate the second data, and cause the one or more switching devices to couple the second communication module to the second antenna.

14. The user device of claim 12, wherein, for the first configuration, the processing device is to cause the first communication module to connect to the second antenna via an antenna matching network and, for the second configuration, the processing device is to cause the second communication module to connect to the second antenna without the antenna matching network, wherein the second antenna is sized for operation in a first frequency band used by the second communication module.

15. The user device of claim 12, wherein, for the first configuration, the processing device is to cause the first communication module to connect to the second antenna via an antenna matching network and, for the second configuration, the processing device is to cause the second communication module to connect to the second antenna via the antenna matching network, wherein the antenna matching network is a reconfigurable antenna matching network, wherein the processing device is to adjust the reconfigurable antenna matching network to cause the reconfigurable antenna matching network to tune the second antenna to a first frequency band used by the first communication module in the first configuration, and wherein the processing device is to adjust the reconfigurable antenna matching network to cause the reconfigurable antenna matching network to tune the second antenna to a second frequency band used by the second communication module in the second configuration.

16. The user device of claim 12, further comprising the processing device to:

determine a first priority for the first communication module;

determine a second priority for the second communication module; and select the first configuration or the second configuration based at least in part on the first priority and the second priority.

17. The user device of claim 12, further comprising an additional switching device to couple the second antenna to a third antenna to radiate electromagnetic energy in a frequency band used by the first communication module, wherein a total combined length of the second antenna and the third antenna causes the first antenna and the third antenna to have a combined first impedance that corresponds to a second impedance associated with the frequency band.

* * * * *